UNITED STATES PATENT OFFICE.

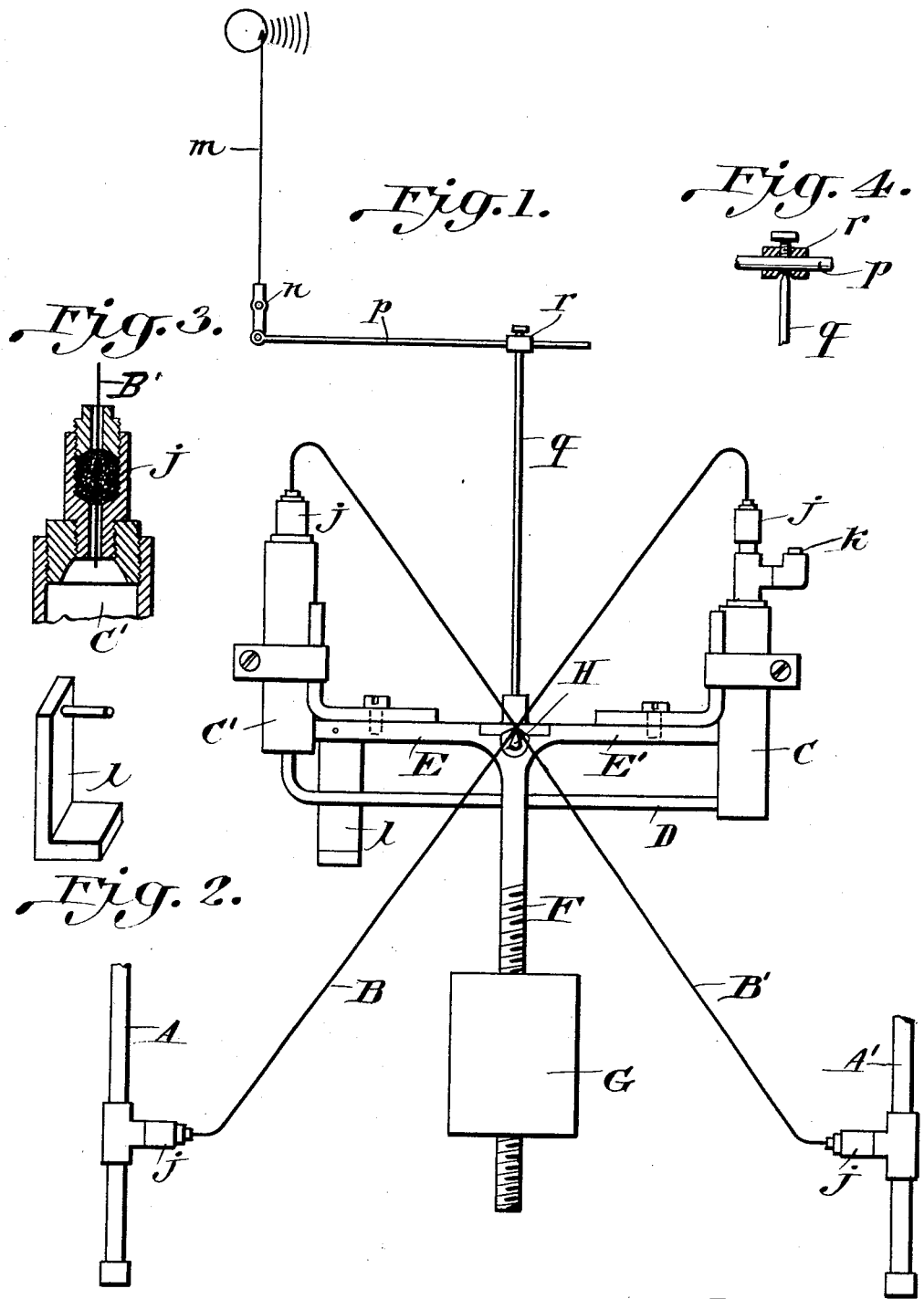

WILLIAM JAMES CROWELL, JR., OF LEBANON, PENNSYLVANIA.

DIFFERENTIAL-PRESSURE GAGE.

1,336,511.  Specification of Letters Patent.  Patented Apr. 13, 1920.

Application filed February 20, 1917. Serial No. 149,970.

*To all whom it may concern:*

Be it known that I, WILLIAM J. CROWELL, Jr., a citizen of the United States, residing in Lebanon, county of Lebanon, in the State of Pennsylvania, have invented a certain new and useful Improvement in Differential-Pressure Gages, of which the following is a true and exact description, reference being had to the accompanying drawings, which form a part thereof.

My invention relates to high pressure fluid differential pressure gages of the pivoted mercury-U-tube type and consists particularly in the improved construction of the flexible connections to the U tube, in the improved construction of the U tube and in the improved construction of the pivoted frame bearing the U tube, as hereinafter specifically described, the novel features being pointed out in the claims.

In the accompanying drawings I have illustrated a preferred embodiment of my invention. Of the drawings: Figure 1 is an elevation of a differential gage. Fig. 2 is a perspective view of the calibration pan. Fig. 3 is a sectional view of a gland packing employed, and Fig. 4 is an elevation partly in section of a portion of the apparatus shown in Fig. 1.

A and A' are sources of differential pressure, A being the "high-pressure" connection and A' the "low-pressure" connection. B and B' are the improved flexible connections; CDC' is the improved mercury U tube charged with mercury, and EE'FG is the improved pivoted frame supporting the U tube, the pivot being the knife edge H.

The flexible connections B and B' consist of tubes transversely flexible but relatively inexpansible in length or thickness under the variation in internal pressure to which they may be subjected. For this purpose I preferably make these connections of equal length small bore metal tubings, crossing the extended axis of the pivot H, approximately symmetrical with one another with respect to this axis except in so far as the tubings are bent to pass one another without touching the tubes connected at their ends to the upper ends of the U tube and to the piping A and A' by screw gland packings $j$. With this improved construction the flexible connections offer minimum resistance to deflection, the deflection being normal to the length of the tubings, and variation in the tendency of one tubing to affect the readings of the apparatus, due to varying static pressure, is neutralized by an equal and opposite variation in the other tubing; and it is very easy to put the tubings in place, adjust them or remove them, due to the gland packing connections $j$ at their ends. As shown in Fig. 3 the flexible connection passes through the gland which is filled with suitable packing, as cotton or asbestos wicking, the packing being compressed by screwing down the screw bushing of the gland, as shown.

The U tube CDC' consists of vertical hollow cylinders, C and C', with screw packing glands $j$, and charging plug $k$ and a connecting pipe D, charged to the level of the pivot H with mercury or other sealing liquid, the high pressure cylinder C when the difference in pressures is zero extending downward below the bottom of the low pressure cylinder C', the U tube being so designed and placed with respect to the pivot H that with zero differential pressure the packing glands are approximately at the same level and the sealing liquid fills C to a depth above D equal to approximately one half the maximum operating differential plus the distance C would rise with this differential, and fills C' to a depth which is sufficient to cover the bottom of the cylinder and avoid surface tension difficulties, and in practice this depth is preferably approximately .3″. Charging to the level of the pivot keeps the turning moment more truly proportional to the differential pressure, as when this is done, the slight rotation of the frame affects the arm of this moment to an extent that is negligibly small, and placing cylinder C lower than cylinder C', as described, results in a minimum cylinder volume and minimum quantity of mercury being needed for successful operation. The cylinder volume is such as to permit the seal being broken in either direction without any escape of the sealing liquid from the U tube. The U tube is charged with mercury or other sealing liquid at $k$.

The frame supporting the U tube has equal lateral arms, so that the vertical limbs of the U tube are at equal distance from the knife edge pivot; has a vertical arm F below the knife edge, threaded and carrying a heavy balance nut G, a nut so heavy that the extreme rotation of the frame is only a few degrees, (about 2° or 3°); has a swinging pan $l$ for calibration weights, the weight of $l$ being made such that it balances the normally greater weight of the high pressure side of the charged U tube over the weight of the low pressure side of the charged U tube. Having the vertical arm F threaded so that the balancing moment may be readily and widely varied permits readily setting the apparatus so that any one of widely different differentials will give the same rotation; and having the balance nut so heavy that the maximum rotation is only a few degrees makes the deflection of the flexible connections very small, preventing these connections from exerting a material influence on the turning moment, and also keeps the cylinders C and C' practically vertical making error from inclination of the cylinders negligibly small; and the swinging calibration pan $l$ puts the whole apparatus in better balance and affords means for quick, easy and accurate calibration, or check of calibration, of the apparatus, it being only necessary to place a calibration weight on the pan $l$ and note the consequent deflection in order to have the deflection that would be given by a specific differential, the calibration weight giving the same deflection as this differential, whatever the setting of the balance nut.

The apparatus is particularly suited for use with time recorders, the deflection due to differential pressure being transmitted in magnified amount to the recording pen of a time recorder in any suitable way, for example as indicated diagrammatically in the drawing where $m$ is a recording pen pivoted at $n$ and controlled by a horizontal link $p$, in turn controlled by the point of the steel rod $q$ fastened in the top of the pivoted frame, an adjustable sleeve $r$ on the link $p$ resting on the point of $q$.

In operation the differential pressure, transmitted from A and A' through B and B' to C and C' forces part of the sealing liquid from C to C', bringing about a transfer of weight from C to C', the consequent turning moment deflecting the pivoted frame from its upright position, and because of the improved construction of the flexible connections, the improved construction of the U tube and the improved construction of the pivoted frame, the amount of this deflection is practically truly proportional to the differential pressure producing it.

The application of this apparatus to measuring and recording the flow of steam, of water, of air or of gas is obvious, and use of the apparatus has shown that its indications are practically "dead-beat," that lag behind the differential is very small, that indications are practically unaffected by sudden and wide variations in static pressure, a sudden drop in static pressure from 150 lbs. to 20 lbs. being without apparent influence upon the reading, that calibration is easily and quickly and accurately made, that the apparatus is readily adjusted to widely different ranges of differential pressure and that its indications are accurate.

Having now described my invention, what I claim as new and desire to secure by Letters Patent, is:

1. In a differential pressure gage, the combination of a U tube, a support on which said U tube is pivoted, and a transversely flexible pressure transmitting tube having one end fixed and the other end connected to one leg of the U tube, and having its body portion radially disposed with respect to the pivotal axis of said U tube.

2. In a differential pressure gage, the combination of a U tube, a support on which said U tube is pivoted, and a transversely flexible small bore metallic pressure transmitting tube having one end fixed and the other end connected to one leg of the U tube, and having its body portion radially disposed with respect to the pivotal axis of said U tube.

3. In a differential pressure gage, the combination of a U tube, a support on which said U tube is pivoted, and a pair of similar transversely flexible small bore metallic pressure transmitting tubes connected one to one and the other to the second of the legs of said U tube, and each crossing the other at or in proximity to the pivotal axis of the U tube.

4. In a differential pressure gage, the combination of a U tube, a support on which said U tube is pivoted, a pair of small bore flexible pressure transmitting tubes, screw gland packings connecting one flexible tube to the upper end of one, and the other flexible tube to the upper end of the second of the legs of the U tubes, said flexible tubes being so disposed as to cross one another in proximity to the pivotal axis of said U tube.

5. In a differential pressure gage, the combination of a U tube comprising vertical hollow cylinders and a connecting pipe, and a support on which said U tube is pivoted, the high pressure cylinder being lower than the low pressure cylinder, and the parts being so relatively proportioned that when the U tube is in its zero differential position and is charged with sealing liquid to the level of the pivotal axis of the U tube, the sealing liquid fills the high pressure cylinder to a depth above the pipe connecting the cylinders equal approximately to one half of the maximum operating differential plus the distance the high pressure cylinder rises under this differential and fills the low pressure cylinder sufficiently to well cover the bottom of the cylinder.

6. In a differential pressure gage, the combination of a U tube comprising vertical hollow cylinders and a connecting pipe, a support on which said U tube is pivoted, a charging connection at the top of the high pressure tube, and flexible pressure transmitting tubes connected one to the top of the low pressure cylinder, and the other to the upper end of the high pressure cylinder through said charging connection the high pressure cylinder being lower than the low pressure cylinder, and the parts being so relatively proportioned that when the U tube is in its zero differential position and is charged with sealing liquid to the level of the pivotal axis of the U tube, the sealing liquid fills the high pressure cylinder to a depth above the pipe connecting the cylinders equal approximately to one half the maximum operating differential plus the distance the high pressure cylinder rises under this differential and fills the low pressure cylinder to a depth which is sufficient to well cover the bottom of the cylinder, and the connections between said flexible tubes and the U tube being approximately at the same level.

7. In a differential pressure gage, the combination of a U tube comprising vertical hollow cylinders and a connecting pipe, a support on which said U tube is pivoted, the high pressure cylinder being lower than the lower pressure cylinder, and the parts being so relatively proportioned that when the U tube is in its zero differential position and is charged with sealing liquid to the level of the pivotal axis of the U tube, the sealing liquid fills the high pressure cylinder to a depth above the pipe connecting the cylinders equal approximately to one-half the maximum operating differential plus the distance the high pressure cylinder rises under this differential and fills the low pressure cylinder to a depth which is but a small fraction of said maximum operating differential, said U tube and support also comprising a threaded arm extending downward below the pivotal axis of the tube, and a balancing unit threaded thereon and heavy enough to restrict the extreme maximum deflection of the U tube to a few degrees.

8. In a differential pressure gage, the combination of a U tube comprising vertical hollow cylinders and a connecting pipe, a support on which said U tube is pivoted, the high pressure cylinder being lower than the low pressure cylinder, and the parts being so relatively proportioned that when the U tube is in its zero differential position and is charged with sealing liquid to the level of the pivotal axis of the U tube, the sealing liquid fills the high pressure cylinder to a depth above the pipe connecting the cylinders equal approximately to one-half the maximum operating differential plus the distance the high pressure cylinder rises under this differential and fills the low pressure cylinder to a depth which is sufficient to well cover the bottom of the cylinder, said U tube and support also comprising a threaded arm extending downward below the pivotal axis of the tube, a balancing unit threaded thereon and heavy enough to restrict the extreme maximum deflection of the U tube to a few degrees, and a pan carried by the U tube and adapted to receive calibrating weights.

WILLIAM JAMES CROWELL, Jr.